US012590859B2

(12) United States Patent
Marvin

(10) Patent No.: US 12,590,859 B2
(45) Date of Patent: Mar. 31, 2026

(54) FOB GEOMETRY FOR LEAK DETECTION IN MOBILE EQUIPMENT

(71) Applicant: Deere & Company, Moline, IL (US)

(72) Inventor: Paul D. Marvin, Dewitt, IA (US)

(73) Assignee: Deere & Company, Moline, IL (US)

( * ) Notice: Subject to any disclaimer, the term of this patent is extended or adjusted under 35 U.S.C. 154(b) by 342 days.

(21) Appl. No.: 18/458,234

(22) Filed: Aug. 30, 2023

(65) Prior Publication Data

US 2025/0076146 A1     Mar. 6, 2025

(51) Int. Cl.
G01M 3/18          (2006.01)

(52) U.S. Cl.
CPC ..................................... G01M 3/18 (2013.01)

(58) Field of Classification Search
CPC ............. G01M 3/00; G01M 3/16; G01M 3/18
See application file for complete search history.

(56) References Cited

U.S. PATENT DOCUMENTS

| | | | | |
|---|---|---|---|---|
| 4,295,669 | A | * | 10/1981 | LaPrade ................ F16L 59/184 |
| | | | | 285/47 |
| 9,245,438 | B2 | | 1/2016 | Burtner et al. |
| 9,482,589 | B2 | | 11/2016 | Ghodrati |
| 10,415,737 | B2 | * | 9/2019 | Alquier ................... F16K 27/12 |
| 10,502,654 | B1 | | 12/2019 | Schroeder et al. |
| 10,565,848 | B2 | * | 2/2020 | Davis ...................... G01M 3/16 |
| 10,593,494 | B2 | | 3/2020 | Furuuchi et al. |
| 10,608,780 | B2 | | 3/2020 | Angelopoulos et al. |
| 10,761,954 | B2 | | 9/2020 | Wang |
| 10,995,883 | B1 | * | 5/2021 | Zeigler ................... F24H 9/133 |
| 11,466,707 | B2 | | 10/2022 | Takahashi et al. |
| 11,585,719 | B2 | | 2/2023 | Ding et al. |
| 2011/0048555 | A1 | | 3/2011 | Malouf et al. |
| 2021/0199532 | A1 | | 7/2021 | Golub et al. |

(Continued)

FOREIGN PATENT DOCUMENTS

| | | |
|---|---|---|
| CN | 209197998 U | 8/2019 |
| CN | 217901122 U | 11/2022 |

(Continued)

OTHER PUBLICATIONS

Machine Translation of KR-20170129370-A (Year: 2017).*

*Primary Examiner* — Nguyen Q. Ha
(74) *Attorney, Agent, or Firm* — Lucian Wayne Beavers; Patterson Intellectual Property Law, PC

(57) ABSTRACT

A hydraulic leak detection apparatus includes a detector body having a bore therethrough configured to receive a cylindrical hydraulic conduit through the bore. The detector body may be eccentrically distributed relative to a central bore axis so as to define a laterally protruding portion of the detector body. The laterally protruding portion of the detector body may have a laterally extending body passage defined therein communicated with the bore. The detector body may have at least one planar side configured to engage an end face of a hydraulic nut attached to the cylindrical hydraulic conduit. A leak detection sensor may be disposed at least partially in the laterally protruding portion of the detector body and communicated with the laterally extending body passage. The laterally extending body passage may be configured to convey hydraulic fluid introduced thereinto through the laterally extending body passage and into engagement with the leak detection sensor.

20 Claims, 4 Drawing Sheets

(56) References Cited

U.S. PATENT DOCUMENTS

| 2021/0232741 | A1 | 7/2021 | Ogiso et al. |
| 2023/0101165 | A1 | 3/2023 | Chernov et al. |

FOREIGN PATENT DOCUMENTS

| KR | 20170129370 | A | * | 11/2017 | ............. H01L 22/30 |
| KR | 102423388 | B1 | | 7/2022 | |
| WO | WO-2018156313 | A1 | * | 8/2018 | .......... G01M 3/2853 |

* cited by examiner

FOB GEOMETRY FOR LEAK DETECTION IN MOBILE EQUIPMENT

BACKGROUND OF THE DISCLOSURE

Field of the Disclosure

The present disclosure relates to a system for detecting oil leaks in the hydraulic system of a work machine.

Background Description

Work machines, such as those used in the construction, agriculture, forestry, or mining industry, may perform a number of operations. These work machines are often required to balance the amount of power distributed to various performance characteristics and operations. The amount of power produced by an engine of the work machine is shared through the machine to move the work machine along different terrain and also operate the various implements that may be coupled to the work machine.

Work machines typically include a hydraulic control system. The hydraulic control system may include one or more hydraulic motors operable to provide torque to drive the work machine. The engine of the work machine may generate power and drive a hydraulic pump. The hydraulic pump may provide hydraulic fluid to the one or more hydraulic motors through a control valve. The hydraulic control system may include tens, if not hundreds, of cylindrical hydraulic conduits operable to hold hydraulic fluid therein for transfer throughout the hydraulic control system. These cylindrical hydraulic conduits are connected throughout the hydraulic control system at various connection points with hydraulic connector nuts.

SUMMARY OF THE DISCLOSURE

This Summary of the Disclosure is provided to introduce a selection of concepts in a simplified form that are further described below in the Detailed Description. This Summary of the Disclosure is not intended to identify key features or essential features of the claimed subject matter, nor is it intended to be used to limit the scope of the claimed subject matter.

One aspect in accordance with the embodiments disclosed herein is a hydraulic leak detection apparatus. The hydraulic leak detection apparatus may include a detector body having a bore therethrough configured to receive a cylindrical hydraulic conduit through the bore. The bore may have a central bore axis. The detector body may be eccentrically distributed relative to the central bore axis so as to define a laterally protruding portion of the detector body. The laterally protruding portion of the detector body may have a laterally extending body passage defined therein communicated with the bore. The detector body may have at least one planar side configured to engage an end face of a hydraulic connector nut attached to the cylindrical hydraulic conduit. A leak detection sensor may be disposed at least partially in the laterally protruding portion of the detector body. The leak detection sensor may be communicated with the laterally extending body passage. The laterally extending body passage may be configured to convey hydraulic fluid introduced thereinto through the laterally extending body passage and into engagement with the leak detection sensor.

Another aspect in accordance with the embodiments disclosed herein is a method of detecting a hydraulic leak in a hydraulic system. The hydraulic system may include a horizontally oriented cylindrical hydraulic conduit and a hydraulic connector nut attached to the cylindrical hydraulic conduit at a hydraulic connection of the hydraulic system. The method may further include providing a detector including a detector body and a sensor. The detector body may have a bore therethrough. The bore may have a central bore axis. The detector body may be eccentrically distributed relative to the central bore axis so as to define a laterally protruding portion of the detector body. The laterally protruding portion of the detector body may have a laterally extending body passage defined therein communicated with the bore. The detector body may have at least one planar side. The sensor may be received in the laterally extending body passage. The method may further include placing the detector body about the cylindrical hydraulic conduit with the at least one planar side engaged with the end face of the hydraulic connector nut, orienting the detector body in a position so that the laterally protruding portion of the detector body extends downwardly, and detecting a leak of hydraulic fluid past the hydraulic connector nut flowing into the bore and into the laterally extending body passage into engagement with the sensor.

Numerous objects, features and advantages of the present invention will be readily apparent to those skilled in the art upon a review of following description in conjunction with the accompanying drawings.

DETAILED DESCRIPTION

Figure 2:
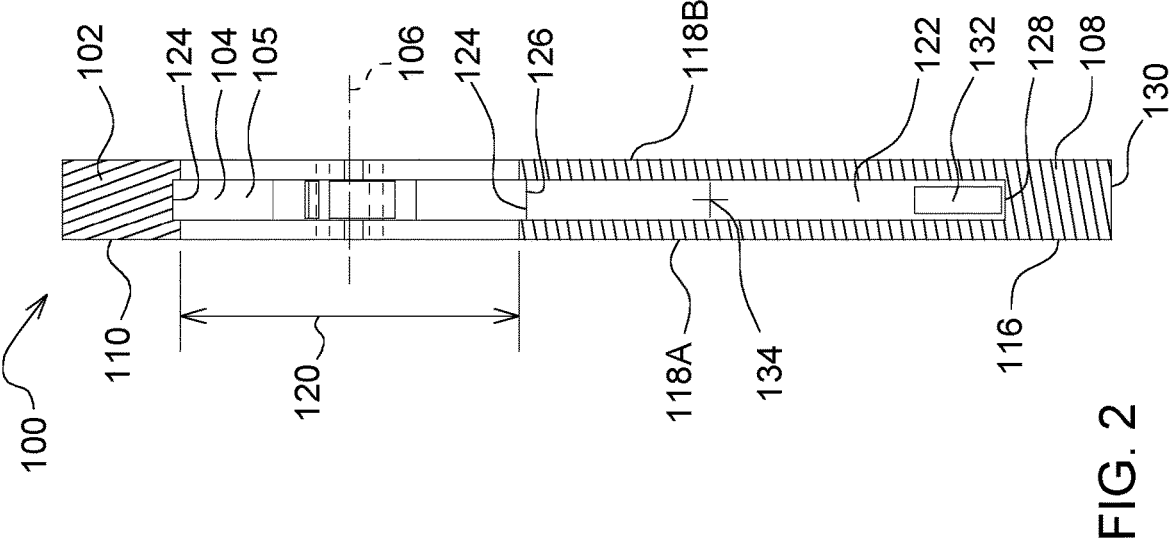
FIG. 2 is a section view of the hydraulic leak detection apparatus of FIG. 1, taken along line 2-2 of FIG. 1.

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected," "attached," "joined," "mounted," "fastened," and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof. Furthermore, any part of the apparatus of the present disclosure may be made using any applicable manufacturing method, such as, but not limited to 3D printing, injection molding, or the like.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

Hydraulic control systems on work machines often develop hydraulic fluid leaks. These hydraulic fluid leaks often develop at or under the hydraulic connector nut at a connection point. Due to the numerosity of the cylindrical hydraulic conduits and connection points, it is often difficult for an operator to locate the source of the hydraulic fluid leak. Thus, hydraulic fluid leaks are typically not discovered through an operator visually witnessing the leak, but rather because an operator noticed the symptoms of a hydraulic fluid leak. Such symptoms may include a reduction in hydraulic fluid levels, a loss of hydraulic power, a loss of hydraulic fluid pressure, or overall poor performance of a work implement to name a few examples. Once operators suspect a hydraulic fluid leak, they often spend extended periods of time visually inspecting each cylindrical hydraulic conduit and connection point searching for the source of the leak. These hydraulic conduits and connection points may be in hard-to-reach areas of the work machine where partial disassembly of the work machine is required. This type of inspection often leads to extended down time of the work machine. Accordingly, a need exists for improvements in hydraulic leak detection on work machines.

Figure 1:
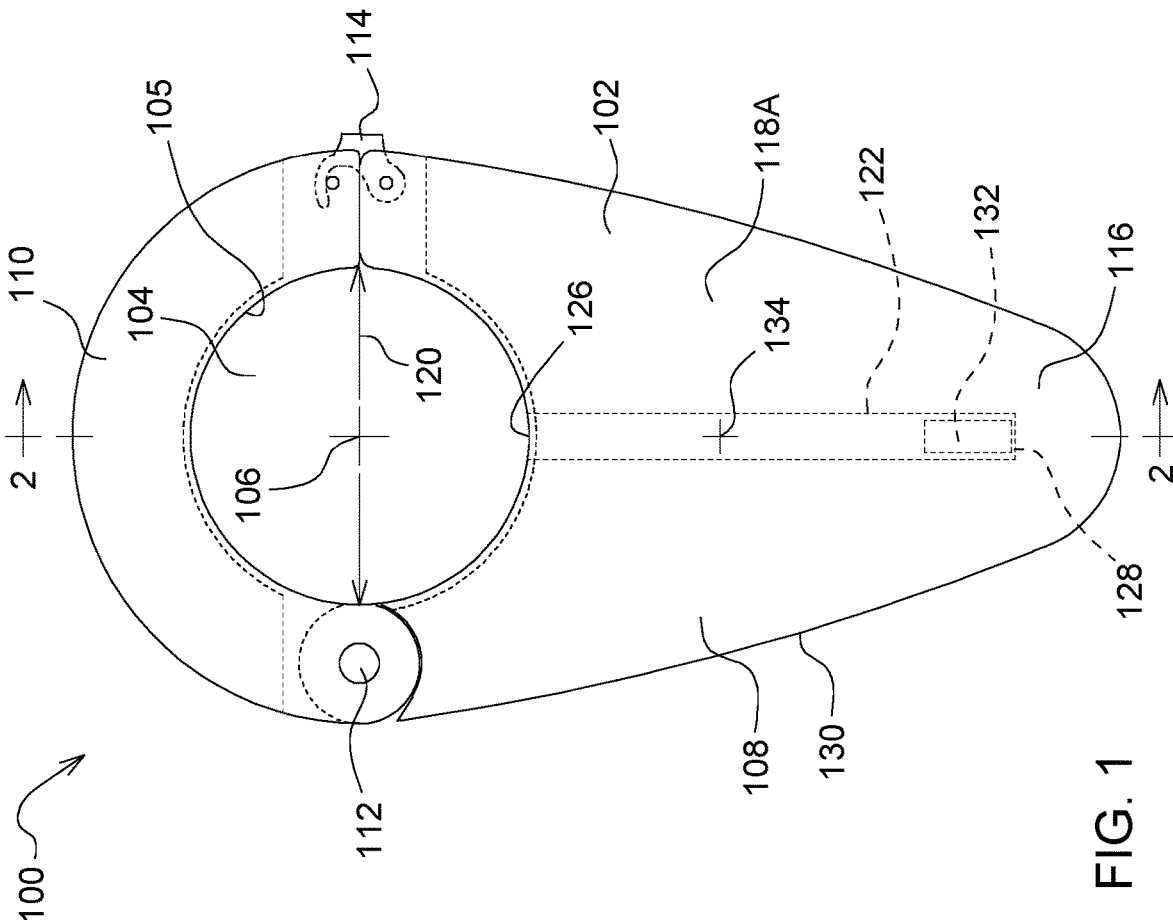
FIG. 1 is a front view of a hydraulic leak detection apparatus in accordance with the present disclosure. The apparatus is in a closed position.

Referring now to FIGS. 1 and 2, a hydraulic leak detection apparatus is shown and generally designated by the number 100. The hydraulic leak detection apparatus 100 may also be referred to herein as a FOB 100 or simply a detector 100.

The hydraulic leak detection apparatus 100 may include a detector body 102. The detector body 102 may be constructed of an elastomeric material such as rubber, polyurethane, or silicone to name a few examples. The detector body 102 may be flexible but resilient, thus allowing the detector body 102 to deform in certain scenarios but maintain its general overall shape.

Figure 4:
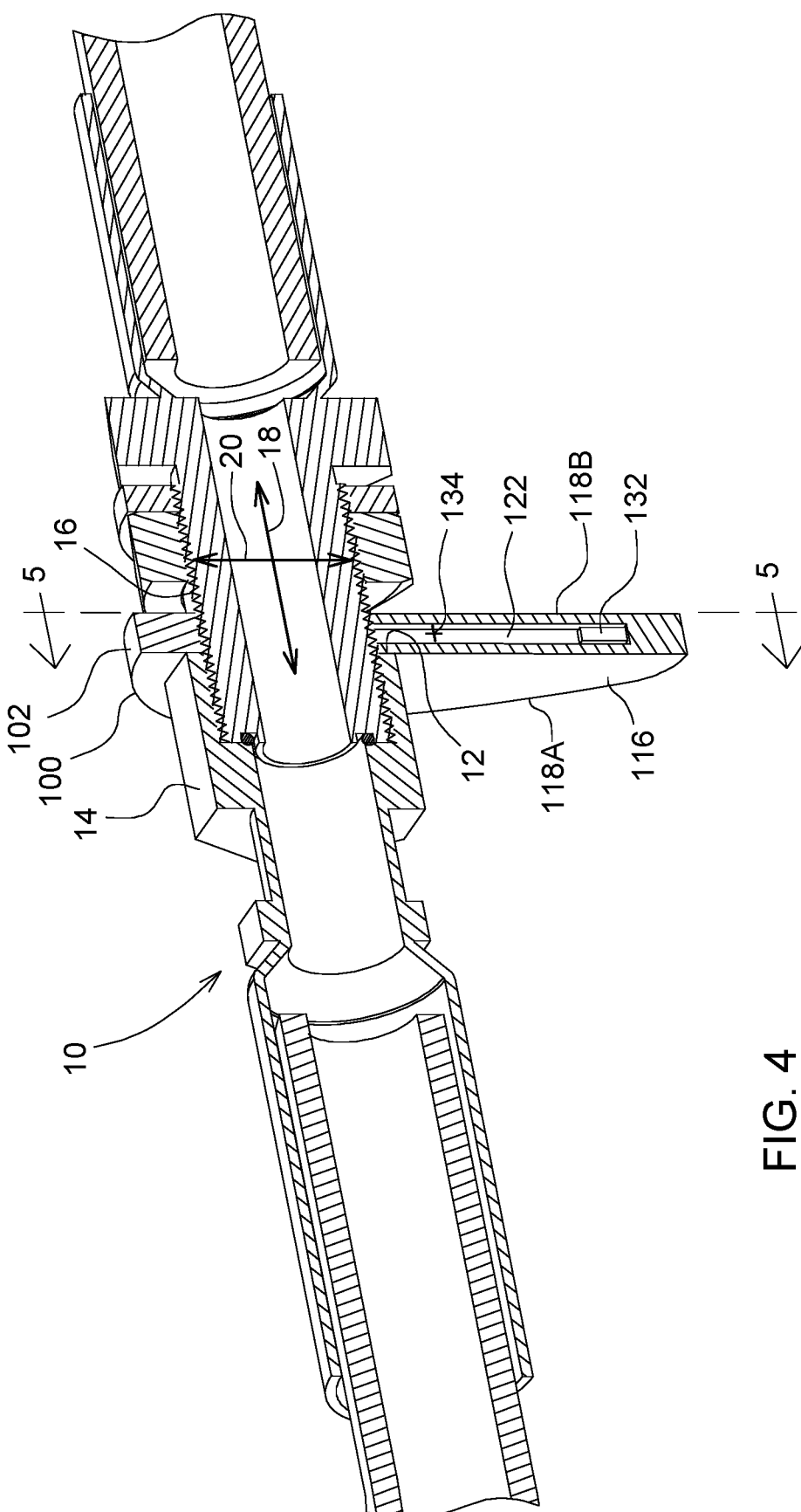
FIG. 4 is a section perspective view of the hydraulic leak detection apparatus of FIG. 1 wherein the hydraulic leak detection apparatus is mounted on a cylindrical hydraulic conduit.

The detector body 102 may have a bore 104 therethrough. The bore 104 may be configured to receive a cylindrical hydraulic conduit 10 through the bore 104, as shown in FIG. 4. The detector body 102 may include a cylindrical inner surface 105 defining the bore 104. The bore 104 may include a central bore axis 106 defined in an axial center of the bore 104.

The detector body 102 may further include a first body part 108, a second body part 110, and a hinge 112. The first body part 108 and the second body part 110 may be pivotally jointed together by the hinge 112. Thus, the first body part 108 and second body part 110 may rotate relative to each other about hinge 112. The first body part 108 and second body part 110 may form all or a portion of the cylindrical inner surface 105.

Figure 3:
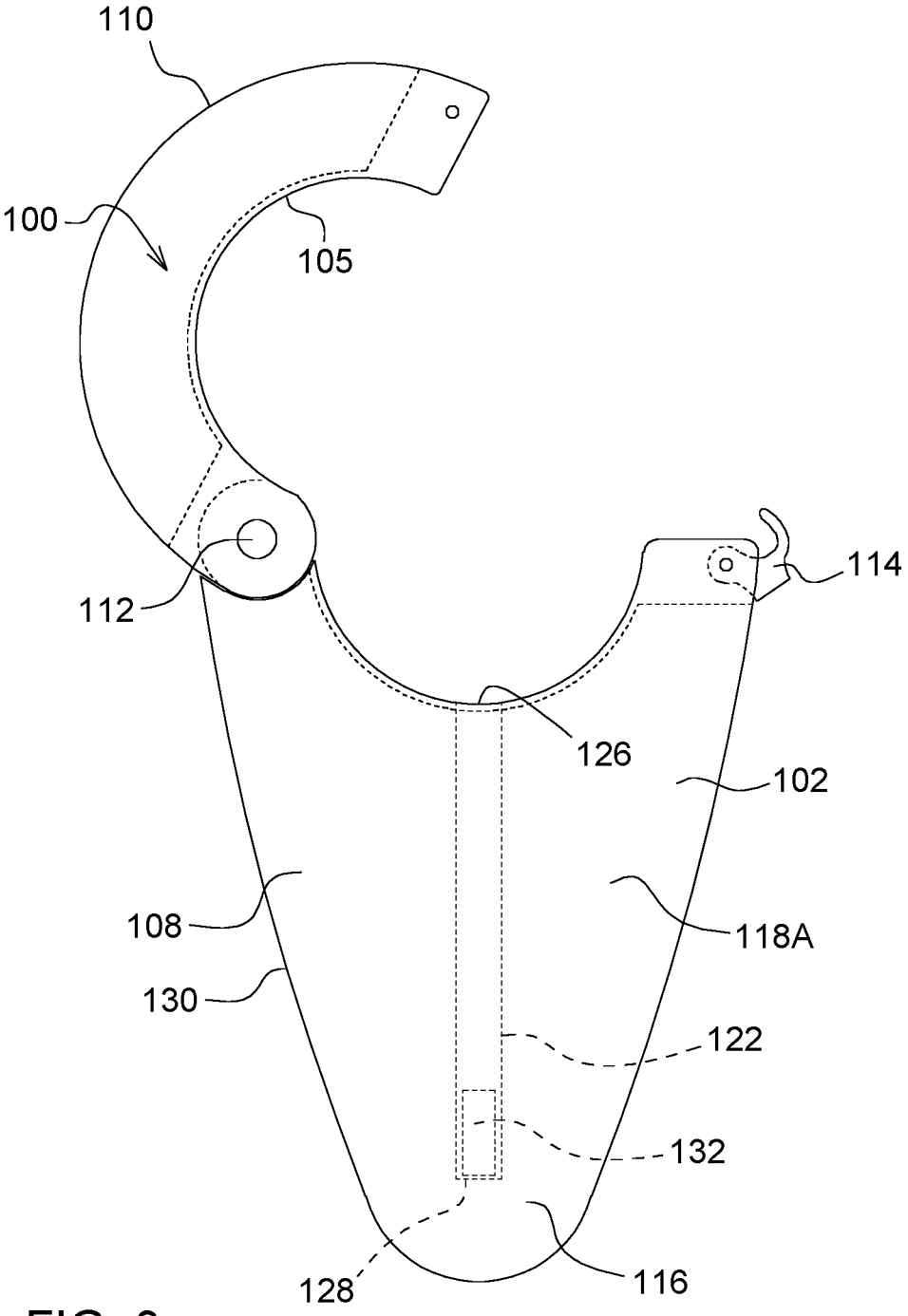
FIG. 3 is a front view of the hydraulic leak detection apparatus of FIG. 1 in an open position.

The detector body 102 may be operable in a closed position and an open position. The detector body 102 is shown in the closed position in FIG. 1 and in the open position in FIG. 3. The hydraulic leak detection apparatus 100 may include a latch 114. The latch 114 may be a hook latch 114 as shown in FIG. 1 or any other type of coupling device. The latch 114 may be configured to latch or selectively couple the first body part 108 and the second body part 110 together in the closed position. In the closed position, the first body part 108 and second body part 110 form a closed loop, thus defining the bore 104. The latch 114 may be configured to unlatch the first body part 108 from the second body part 110 such that the detector body 102 may be configured in the open position. In the open position, the first body part 108 and second body part 110 may be rotated about hinge 112 relative to one another such that the first body part 108 and second body part 110 do not form a closed loop. The hydraulic leak detection apparatus 100 may be configured in the open position when the hydraulic leak detection apparatus 100 is being mounted to or removed from a cylindrical hydraulic conduit 10.

The detector body 102 being configurable in both the closed and open positions may allow the hydraulic leak detection apparatus 100 to be coupled to an existing cylindrical hydraulic conduit 10 without disconnecting the existing cylindrical hydraulic connection. One advantage of this feature may be reduced hydraulic leak detection apparatus 100 installation time because an operator does not need to disable all or a portion of the hydraulic system to install the hydraulic leak detection apparatus 100. Another advantage may be that the hydraulic leak detection apparatus 100 may easily be removed from an existing connection and reused on a different connection.

The detector body 102 may be eccentrically distributed relative to the central bore axis 106 so as to define a laterally protruding portion 116 of the detector body 102. The detector body 102 may have at least one planar side 118 configured to engage an end face 12 of a hydraulic connector nut 14 attached to the cylindrical hydraulic conduit 10. The at least one planar side 118 may include two oppositely facing planar sides, namely a first planar side 118A and a second planar side 118B. Each of the first planar side 118A and second planar side 118B may be perpendicular to the central bore axis 106. The first planar side 118A and second planar side 118B may be identical such that either of the planar sides may engage the hydraulic connector nut 14. Thus, in certain optional embodiments, the first planar side 118A may engage the end face 12 of the hydraulic connector nut 14. In other optional embodiments, the second planar side 118B may engage the end face 12 of the hydraulic connector nut 14.

Referring now to FIG. 4, the hydraulic leak detection apparatus 100 may be configured to be attached to a cylindrical hydraulic conduit 10. More specifically, the bore 104 of the hydraulic leak detection apparatus 100 may receive the cylindrical hydraulic conduit 10 therein. The at least one planar side 118 of the hydraulic leak detection apparatus 100 may engage the end face 12 of the hydraulic connector nut 14. The cylindrical hydraulic conduit 10 may include an outer surface 16. In certain optional embodiments of the cylindrical hydraulic conduit 10, the outer surface 16 may be a threaded surface. The bore 104 of the detector body 102 may provide a sliding interference fit with the outer surface 16 of the cylindrical hydraulic conduit 10. The sliding interference fit may provide frictional resistance to movement of the cylindrical hydraulic conduit 10 along a length 18 of the cylindrical hydraulic conduit 10. The sliding interference fit may be created when a bore diameter 120 of the bore 104 is less than or equal to a conduit diameter 20 of the outer surface 16 of the cylindrical hydraulic conduit 10. The detector body 102 may be flexible such that the bore 104 may receive the cylindrical hydraulic conduit 10 when the conduit diameter 20 of the outer surface 16 of the cylindrical hydraulic conduit 10 is greater than or equal to the bore diameter 120 of the bore 104. The at least one planar side 118 of the detector body 102 may be engaged with the end face 12 of the hydraulic connector nut 14 so that hydraulic fluid leaking from under or past the hydraulic connector nut 14 flows into the bore 104. Thus, the sliding interference fit maintains the position of the hydraulic leak detection apparatus 100 against the hydraulic connector nut 14 and resists movement of the hydraulic leak detection apparatus 100 along the length 18 of the cylindrical hydraulic conduit 10.

The laterally protruding portion 116 of the detector body 102 may have a laterally extending body passage 122 defined therein. The laterally extending body passage 122 may be in communication with the bore 104. An annular groove 124 may be defined in the cylindrical inner surface 105 of the detector body 102. The annular groove 124 may intersect the laterally extending body passage 122 in the laterally protruding portion 116 of the detector body 102. The laterally extending body passage 122 may have an open end 126 defined in the cylindrical inner surface 105 of the detector body 102 and a closed end 128 located nearer to an outer edge 130 of the detector body 102 than to the cylindrical inner surface 105 of the detector body 102. The annular groove 124 may be operable to receive hydraulic fluid leaking from under or past the hydraulic connector nut 14 and direct the hydraulic fluid toward the open end 126 of the laterally extending body passage 122 such that the hydraulic fluid flows into the laterally extending body passage 122.

The hydraulic leak detection apparatus 100 may include a leak detection sensor 132. The leak detection sensor 132 may be disposed at least partially in the laterally protruding portion 116 of the detector body 102. Specifically, the leak detection sensor 132 may be communicated or located within the laterally extending body passage 122. The leak detection sensor 132 may be nearer the closed end 128 of the laterally extending body passage 122 than the open end of the laterally extending body passage 122. The laterally extending body passage 122 may be configured to convey hydraulic fluid introduced thereinto through the laterally extending body passage 122 and into engagement with the leak detection sensor 132.

Figures 5, 6:
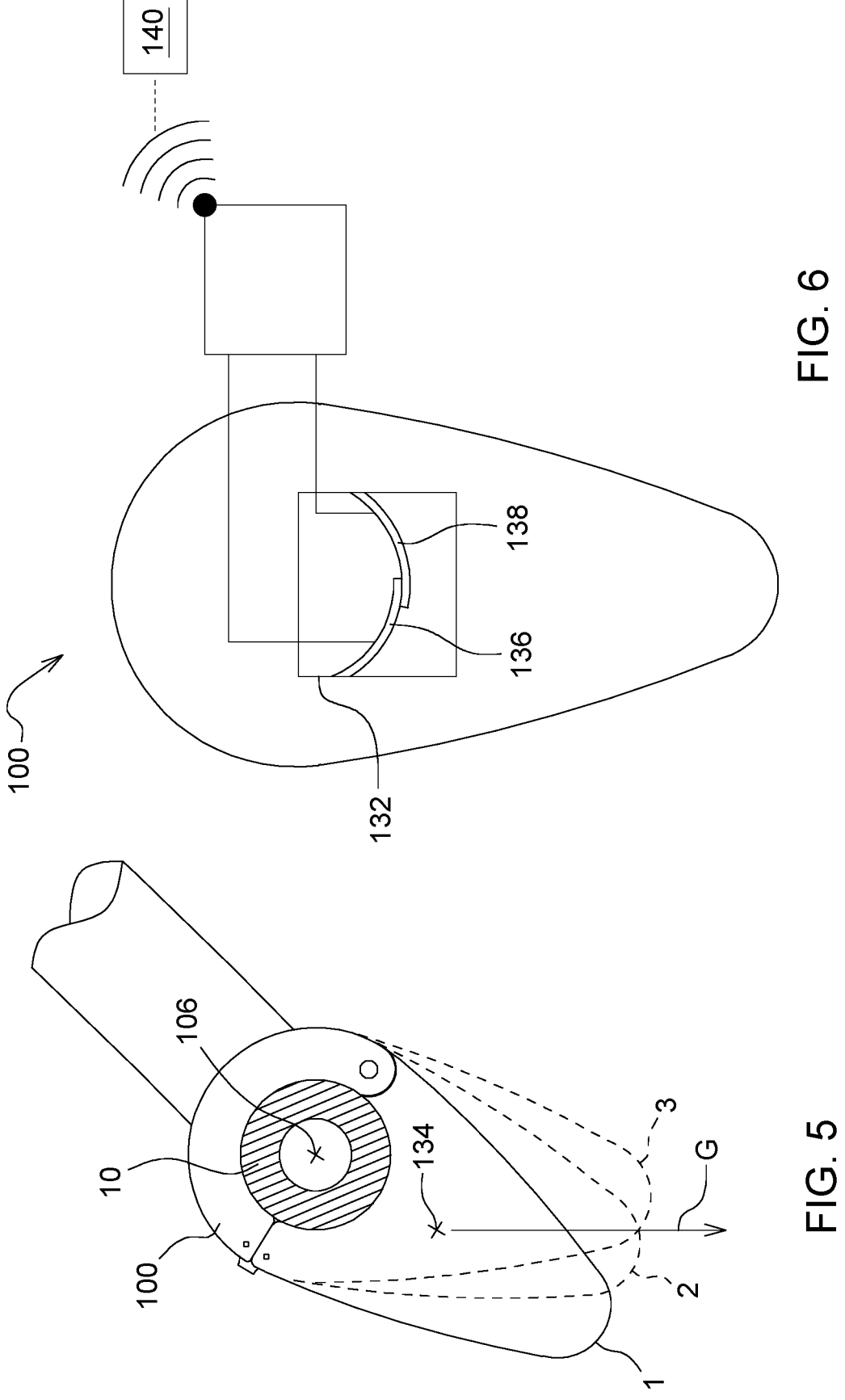
FIG. 5 is a front view of the hydraulic leak detection apparatus of FIG. 1 wherein the hydraulic leak detection apparatus is mounted to the cylindrical hydraulic conduit, taken along line 5-5 of FIG. 4.
FIG. 6 is a schematic view of the leak detection circuit of the hydraulic leak detection apparatus of FIG. 1.

Referring now to FIG. 6, the leak detection sensor 132 may be operable to generate a control signal representing a detection of hydraulic fluid. The leak detection sensor 132 may include a first pin 136 and a second pin 138. The first and second pins 136, 138 may be coupled together by an adhesive. The adhesive may be operable to dissolve when contacted by liquid, such as hydraulic fluid. The first and second pins 136, 138 may be spring biased to separate from one another. Thus, the leak detection sensor 132 may be operable such that when the leak detection sensor 132 is contacted by hydraulic fluid, the adhesive dissolves, the first and second pins 136, 138 separate, and the control signal is generated. While one exemplary leak detection sensor 132 is shown in FIG. 6, the leak detection sensor 132 may be any other type of sensor operable to detect the presence of a fluid, namely hydraulic fluid.

As shown in FIGS. 1-2 and 4-5, the detector body 102 may include a center of gravity 134. The laterally protruding portion 116 of the detector body 102 and the leak detection sensor 132 may be configured such that the center of gravity 134 may be offset from the central bore axis 106 and located within the laterally protruding portion 116 of the detector body 102. In certain optional embodiments, the center of gravity 134 may be located within the laterally extending body passage 122.

Referring specifically to FIG. 5, when the hydraulic leak detection apparatus 100 is mounted on a horizontally oriented cylindrical hydraulic conduit 10, a gravitational force G acting on the hydraulic leak detection apparatus 100 may urge the hydraulic leak detection apparatus 100 to rotate about the central bore axis 106 toward a position wherein the laterally protruding portion 116 of the detector body 102 is oriented in a downward direction. Thus, the laterally protruding portion 116 may have a vertical position below the central bore axis 106. The sliding interference fit of the bore 104 of the detector body 102 and the outer surface 16 of the cylindrical hydraulic conduit 10 may permit rotational movement of the hydraulic leak detection apparatus 100 about the cylindrical hydraulic conduit 10. The rotational movement may be in response to gravitational force G acting on the center of gravity 134 of the hydraulic leak detection apparatus 100. The work machine may generate vibration that is transmitted throughout the hydraulic control system. The vibration may partially cause general rotational movement of the hydraulic leak detection apparatus 100 about the cylindrical hydraulic conduit 10. The center of gravity 134 being located within the laterally protruding portion 116 of the detector body 102 and the gravitational force G acting on the center of gravity 134 may urge the hydraulic leak detection apparatus 100 to rotate toward a position wherein the laterally protruding portion 116 of the detector body 102 is oriented in a downward direction. FIG. 5 depicts the hydraulic leak detection apparatus 100 coupled to a cylindrical hydraulic conduit 10 wherein the hydraulic leak detection apparatus 100 rotates through three sequential positions, beginning at position 1 and rotating through position 2 to position 3.

The work machine may include a control system including a controller 140. The controller 140 may be part of the machine control system of the work machine, or it may be a separate control module. The controller 140 may be configured to receive input signals from various sensors. Specifically, the controller 140 may be configured to receive input signals from the hydraulic leak detection apparatus 100 representing the detection of hydraulic fluid. The controller 140 may be operable to alert an operator of the hydraulic fluid leak on an operator display.

Another aspect of the present disclosure is a method of detecting a hydraulic leak in a hydraulic system. The hydraulic system may include the horizontally oriented cylindrical hydraulic conduit 10 and the hydraulic connector nut 14 attached to the cylindrical hydraulic conduit 10 at the hydraulic connection of the hydraulic system.

The method may include providing the hydraulic leak detection apparatus 100 as previously described herein. The bore 104 of the detector body 102 may be operable to engage the outer surface 16 of the cylindrical hydraulic conduit 10 with an interference fit providing frictional resistance to movement of the detector along the length 18 of the cylindrical hydraulic conduit 10. The interference fit may be sufficiently loose that orienting the detector body 102 in a position so that the laterally protruding portion 116 of the detector body 102 extends downwardly can be performed by rotating the detector body 102 about the central bore axis 106 after placing the detector body 102 about the cylindrical hydraulic conduit 10 with the at least one planar side 118 engaged with the end face 12 of the hydraulic connector nut 14. The interference fit may be sufficiently loose such that the detector body 102 resists lateral movement along the length 18 of the cylindrical hydraulic conduit 10 but may still rotate about the cylindrical hydraulic conduit 10.

The method may further include placing the detector body 102 about the cylindrical hydraulic conduit 10 with the at least one planar side 118 engaged with the end face 12 of the hydraulic connector nut 14. The detector body 102 may be opened or placed in the open position by pivoting the first body part 108 and the second body part 110 relative to each other. The opened detector body 102 may then be placed about the cylindrical hydraulic conduit 10. The detector body 102 may then be closed or placed in the closed position by pivoting the first body part 108 and the second body part 110 relative to each other such that a closed loop is formed. The latch 114 may latch the first body part 108 to the second body part 110. The bore 104 of the detector body 102, namely the cylindrical inner surface 105, may engage the threaded outer surface 16 of the cylindrical hydraulic conduit 10 with the interference fit providing frictional resistance to movement of the hydraulic leak detection apparatus 100 along the length 18 of the cylindrical hydraulic conduit 10. The at least one planar side 118 may be held such that it is engaged with the end face 12 of the hydraulic connector nut 14 in response to the interference fit.

Referring to FIG. 5, the method may further include orienting the detector body 102 in a position so that the laterally protruding portion 116 of the detector body 102 extends downwardly. This orienting of the detector body 102 may be done manually on installation. In one optional embodiment, the detector body 102 may be rotated about the central bore axis 106 in response to gravity toward the position wherein the laterally protruding portion 116 of the detector body 102 extends downwardly. Downward rotation due to gravitational force G may occur in response to vibration of the hydraulic system. Gravitational force G acting on the eccentrically located center of gravity 134 will tend to cause the detector 100 to remain in a downward orientation. FIG. 5 depicts the hydraulic leak detection apparatus 100 coupled to a cylindrical hydraulic conduit 10 wherein the hydraulic leak detection apparatus 100 rotates through three sequential positions, beginning at position 1 and rotating through position 2 to position 3.

The method may further include detecting a leak of hydraulic fluid past the hydraulic connector nut 14 flowing into the bore 104 and into the laterally extending body passage 122 into engagement with the leak detection sensor 132. The hydraulic fluid may first be received within the annular groove 124 of the cylindrical inner surface 105. Due to the downward orientation of the laterally protruding portion 116 and laterally extending body passage 122, gravity may cause the hydraulic fluid to flow from the annular groove 124 into the laterally extending body passage 122 and contact the leak detection sensor 132. When the leak detection sensor 132 is contacted by the hydraulic fluid, the adhesive may dissolve, the first and second pins 136, 138 may separate, and the leak detection sensor 132 may generate a control signal representing a detection of hydraulic fluid.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A hydraulic leak detection apparatus, comprising:
   a detector body having a bore therethrough configured to receive a cylindrical hydraulic conduit through the bore, the bore having a central bore axis, the detector body being eccentrically distributed relative to the central bore axis so as to define a laterally protruding portion of the detector body, the laterally protruding portion of the detector body having a laterally extending body passage defined therein communicated with the bore, the detector body having at least one planar outer side configured to engage an end face of a hydraulic connector nut attached to the cylindrical hydraulic conduit, the bore intersecting the at least one planar outer side and defining an opening in the at least one planar outer side so that hydraulic fluid leaking from under or past the hydraulic connector nut may flow through the opening into the detector body; and
   a leak detection sensor disposed at least partially in the laterally protruding portion of the detector body, the leak detection sensor being communicated with the laterally extending body passage, the laterally extending body passage configured to convey hydraulic fluid introduced thereinto through the laterally extending body passage and into engagement with the leak detection sensor.

2. The apparatus of claim 1, wherein:
   the detector body includes a center of gravity,
   wherein the center of gravity is offset from the central bore axis and located within the laterally protruding portion, and
   wherein the center of gravity causes the detector body to rotate about the central bore axis in response to gravity to cause the laterally protruding portion to have a vertical position below the central bore axis when the detector body is horizontally mounted.

3. The apparatus of claim 1, wherein:

the detector body includes a first body part, a second body part, and a hinge, and wherein the first body part and the second body part are pivotally joined together by the hinge.

4. The apparatus of claim 3, further comprising:

a latch configured to latch the first body part and the second body part together in a closed position.

5. The apparatus of claim 1, wherein:

the detector body is constructed of an elastomeric material.

6. The apparatus of claim 1, wherein:

the at least one planar outer side of the detector body includes two oppositely facing planar outer sides, each planar outer side being perpendicular to the central bore axis.

7. The apparatus of claim 1 in combination with the cylindrical hydraulic conduit, wherein:

the bore of the detector body provides a sliding interference fit with an outer surface of the cylindrical hydraulic conduit so that the sliding interference fit provides frictional resistance to movement of the apparatus along a length of the conduit.

8. The combination of claim 7, wherein:

the laterally protruding portion of the detector body and the leak detection sensor are configured such that a center of gravity of the apparatus is located within the laterally protruding portion of the detector body so that when the apparatus is mounted on a horizontally oriented cylindrical hydraulic conduit gravitational force acting on the apparatus will urge the apparatus to rotate about the central bore axis toward a position wherein the laterally protruding portion of the detector body is oriented in a downward direction; and the sliding interference fit with the outer surface of the cylindrical hydraulic conduit further permits rotational movement of the apparatus about the cylindrical hydraulic conduit in response to gravitational force acting on the center of gravity of the apparatus.

9. The combination of claim 7, wherein:

the outer surface of the cylindrical hydraulic conduit is a threaded surface.

10. The combination of claim 7, further comprising:

the hydraulic connector nut attached to the cylindrical hydraulic conduit; and wherein the at least one planar outer side is engaged with the end face of the hydraulic connector nut so that hydraulic fluid leaking past the hydraulic connector nut flows into the bore.

11. The combination of claim 7, wherein:

the detector body is constructed of an elastomeric material.

12. A hydraulic leak detection apparatus, comprising:

a detector body having a bore therethrough configured to receive a cylindrical hydraulic conduit through the bore, the bore having a central bore axis, the detector body being eccentrically distributed relative to the central bore axis so as to define a laterally protruding portion of the detector body, the laterally protruding portion of the detector body having a laterally extending body passage defined therein communicated with the bore, the detector body having at least one planar side configured to engage an end face of a hydraulic connector nut attached to the cylindrical hydraulic conduit; and a leak detection sensor disposed at least partially in the laterally protruding portion of the detector body, the leak detection sensor being communicated with the laterally extending body passage, the laterally extending body passage configured to convey hydraulic fluid introduced thereinto through the laterally extending body passage and into engagement with the leak detection sensor;

wherein the detector body includes a cylindrical inner surface defining the bore, and the detector body has an annular groove defined in the cylindrical inner surface, the annular groove intersecting the laterally extending body passage in the laterally protruding portion of the detector body.

13. A method of detecting a hydraulic leak in a hydraulic system including a horizontally oriented cylindrical hydraulic conduit and a hydraulic connector nut attached to the cylindrical hydraulic conduit at a hydraulic connection of the hydraulic system, the method comprising:

providing a detector including a detector body and a sensor, the detector body having a bore therethrough, the bore having a central bore axis, the detector body being eccentrically distributed relative to the central bore axis so as to define a laterally protruding portion of the detector body, the laterally protruding portion of the detector body having a laterally extending body passage defined therein communicated with the bore, the detector body having at least one planar side, the sensor being received in the laterally extending body passage;

placing the detector body about the cylindrical hydraulic conduit with the at least one planar side engaged with the end face of the hydraulic connector nut;

orienting the detector body in a position so that the laterally protruding portion of the detector body extends downwardly; and detecting a leak of hydraulic fluid past the hydraulic connector nut flowing into the bore and into the laterally extending body passage into engagement with the sensor.

14. The method of claim 13, wherein:

the laterally protruding portion of the detector body and the leak detection sensor are configured such that a center of gravity of the detector is located within the laterally protruding portion of the detector body; and orienting the detector body in a position so that the laterally protruding portion of the detector body extends downwardly includes rotating the detector body about the central bore axis in response to gravity toward the position wherein the laterally protruding portion of the detector body extends downwardly.

15. The method of claim 14, wherein:

the bore of detector body engages an outer surface of the cylindrical hydraulic conduit with an interference fit providing frictional resistance to movement of the detector along a length of the cylindrical hydraulic conduit; and orienting the detector body in a position so that the laterally protruding portion of the detector body extends downwardly includes rotating the detector body about the central bore axis in response to vibration of the hydraulic system, the rotating being toward the position wherein the laterally protruding portion of the detector body extends downwardly so that the laterally protruding portion of the detector body remains oriented downwardly.

16. The method of claim 13, wherein:

placing the detector body about the cylindrical hydraulic conduit includes engaging the bore of the detector body with an outer surface of the cylindrical hydraulic conduit with an interference fit providing frictional resistance to movement of the detector along a length of the cylindrical hydraulic conduit.

17. The method of claim 16, wherein:

placing the detector body about the cylindrical hydraulic conduit with the at least one planar side engaged with the end face of the hydraulic connector nut comprises engaging the detector body with a threaded outer surface of the cylindrical hydraulic conduit.

18. The method of claim 16, wherein:

placing the detector body about the cylindrical hydraulic conduit with the at least one planar side engaged with the end face of the hydraulic connector nut comprises holding the at least one planar side engaged with the end face of the hydraulic connector nut in response to the interference fit.

19. The method of claim 16, wherein:

the laterally protruding portion of the detector body and the leak detection sensor are configured such that a center of gravity of the detector is located within the laterally protruding portion of the detector body; and orienting the detector body in the position so that the laterally protruding portion of the detector body extends downwardly includes rotating the detector body about the central bore axis after placing the detector body about the cylindrical hydraulic conduit with the at least one planar side engaged with the end face of the hydraulic connector nut.

20. The method of claim 13, wherein:

placing the detector body about the cylindrical hydraulic conduit with the at least one planar side engaged with the end face of the hydraulic connector nut includes opening the detector body by pivoting two body parts of the detector body relative to each other, then placing the opened detector body about the cylindrical hydraulic conduit, and then closing the detector body.

* * * * *